Aug. 9, 1932.  C. A. CAMPBELL  1,871,210
AIR BRAKE
Filed Oct. 8, 1931  2 Sheets-Sheet 2

Inventor
Charles A. Campbell
Attorneys

Patented Aug. 9, 1932

1,871,210

UNITED STATES PATENT OFFICE

CHARLES A. CAMPBELL, OF WATERTOWN, NEW YORK, ASSIGNOR TO THE NEW YORK AIR BRAKE COMPANY, A CORPORATION OF NEW JERSEY

AIR BRAKE

Application filed October 8, 1931. Serial No. 567,698.

This invention relates to air brakes, and particularly to a filler piece and related connections for connecting a single triple valve to a plurality of reservoirs and to a brake cylinder.

While generally applicable to triple valves controlling flow to and from a plurality of reservoirs, the invention has been developed for and is particularly adapted to that type of triple valve in which the auxiliary reservoir alone furnishes the air for service applications, and both reservoirs furnish the air for emergency applications.

Triple valves operating as above suggested are now developed. Their outstanding advantage is their capability of effecting an emergency application following a service application of any intensity.

In such valves it is usual to provide independent connections between the triple valve and each of the reservoirs. This ensures complete control of the flow from each reservoir to the brake cylinder, and complete control of the charging rate to each reservoir. This last permits the charging to be so controlled that the supplemental reservoir will not absorb undue quantities of air at the initiation of release, and thus delay the propagation of the releasing pressure wave throughout the brake pipe.

A feature of the invention is that it is adaptable to conventional auxiliary reservoirs of the freight type. With such reservoirs, as used heretofore, the brake cylinder is mounted on the front end, and the triple valve on the rear end, of the reservoir, and the brake cylinder port of the triple valve communicates directly with the brake cylinder pipe which leads through the interior of the reservoir to the brake cylinder. Such reservoirs are standard, and are in such extensive use that their retention is an important economic factor when changes of brake equipment are contemplated.

The invention contemplates the interposition between the triple valve and the auxiliary reservoir of a filler piece to which the supplemental reservoir is connected, the filler piece serving to connect the triple valve with the auxiliary reservoir, supplemental reservoir, and the brake cylinder pipe. It further contemplates the formation in such filler piece of a small, but substantial, volume normally connected with the supplemental reservoir. The purpose of this is to provide, even when the supplemental reservoir is disconnected from the filler piece (as the result of accident or otherwise), a sort of miniature supplemental reservoir which is charged by the triple valve. This is necessary with certain types of double reservoir triple valve, as these include, and depend for certain phases of their operation upon a movable abutment subject to and operated by supplemental reservoir pressure. With the supplemental reservoir disconnected and the connection blanked, the triple valve functions as a single reservoir valve and performs the normal service functions.

A valuable feature of the design of the filler piece (particularly important during the transition period from the present K triple valve to the proposed new double reservoir triple valves) is the possibility of substituting a standard K (single reservoir) triple valve for the new type double reservoir valve, such application serving to connect the K triple valve to the auxiliary reservoir and blank the connection to the supplemental reservoir.

The preferred embodiment of the invention is illustrated in the accompanying drawings, in which:—

Figure 1:
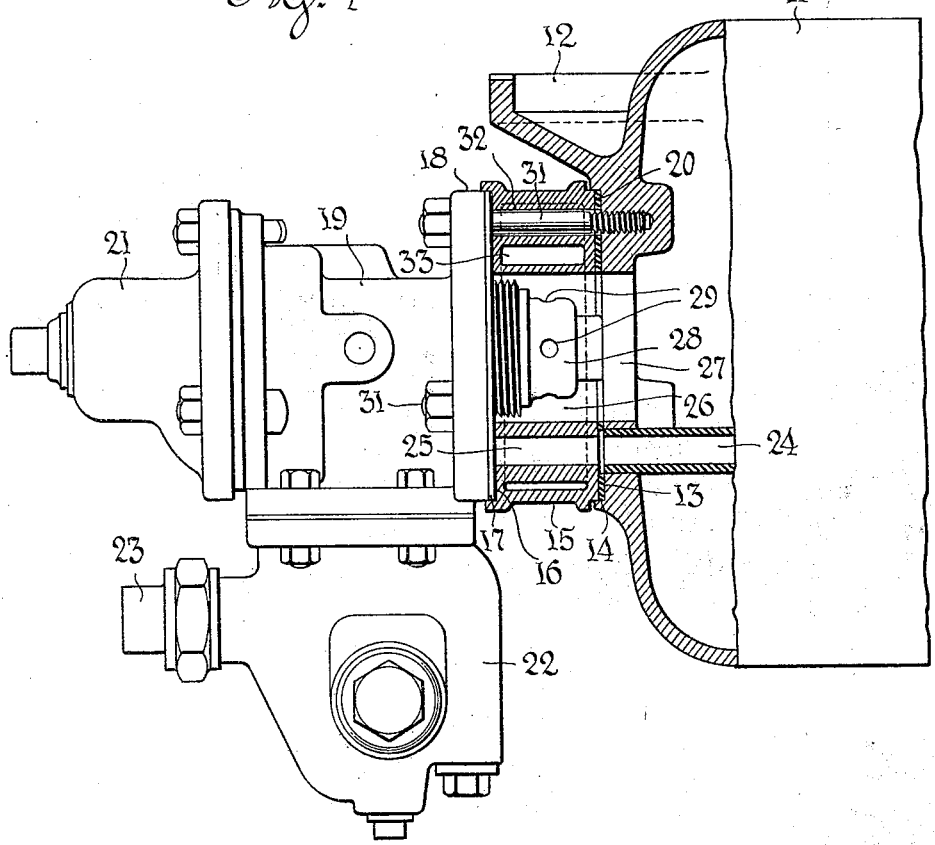
Fig. 1 is a view partly in elevation and partly in vertical axial section, showing a filler piece, constructed according to the invention, mounted between an auxiliary reservoir of the standard freight type and a triple valve of the two-reservoir type.
Figure 2:
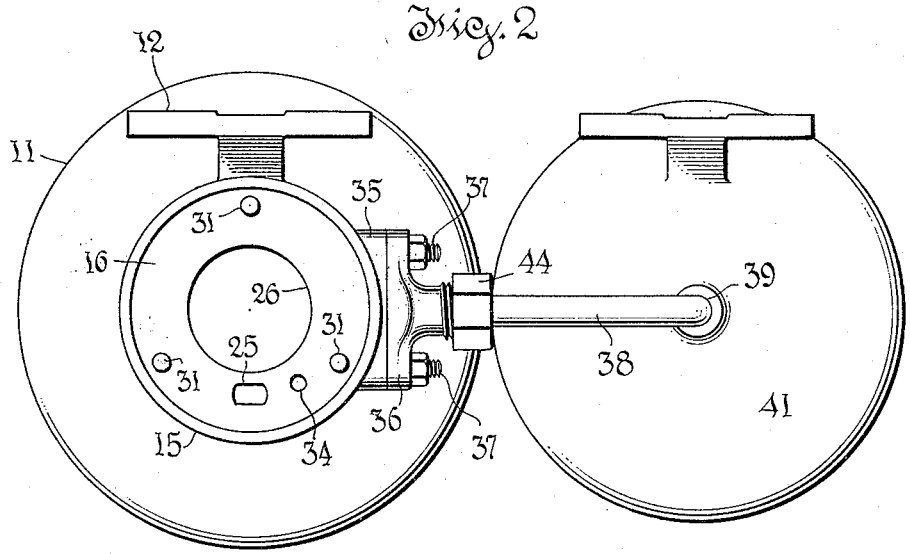
Fig. 2 is an end elevation of an auxiliary reservoir and a supplemental reservoir with a filler piece mounted on the rear end of the auxiliary reservoir and connected with the supplemental reservoir.

In the drawings, 11 represents the auxiliary reservoir, and a portion of the rear end supporting bracket is shown at 12. At the rear end is a recessed seat 13 provided with a ported gasket 14, and this seat and gasket in the present standard arrangement receive the triple valve. According to the present invention a filler piece 15 having a mating face 20 to register with seating face 13, is mounted on this face and offers a similar recessed face 16 for the gasket 17 and the mounting flange 18 of the triple valve designated by the numeral 19 applied to its body.

The front cap of the triple valve appears at 21, the lower case at 22 and the brake pipe connection at 23.

Extending through the reservoir 11 is the brake cylinder pipe 24 which, as usual, leads to the brake cylinder (not shown, but conforming to standard practice) mounted on the forward end of the reservoir 11. The filler piece 15 has a through passage 25 which communicates with pipe 24 and the usual brake cylinder port of the triple valve. The gaskets 14 and 17 have ports which register with the passage 25.

The filler piece 15 has a central aperture 26 which registers with the aperture 27 on the end of reservoir 11. The gaskets 14 and 17 have central apertures to correspond, and the aperture 26 receives the retard stop guide 28 which has ports 29 leading to the slide valve chamber of the triple valve. Thus the slide valve chamber of the triple valve communicates directly with the auxiliary reservoir, as usual.

The triple valve flange 18, filler piece 15, and auxiliary reservoir 11 are held together by three studs 31, identical with the usual standard studs, except that they are longer to accommodate the added thickness of the filler piece 15.

Figure 3:
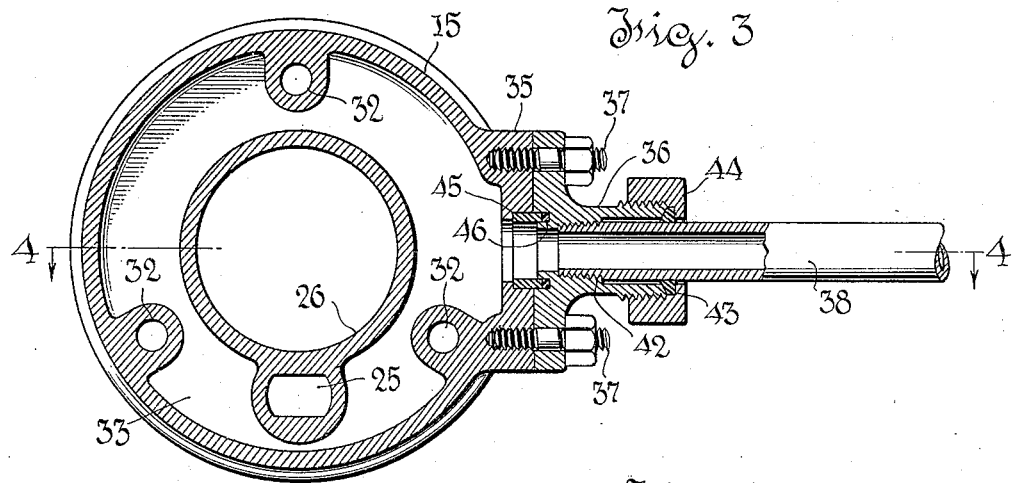
Fig. 3 is an enlarged section through the filler piece on the line 3—3 of Fig. 4.
Figure 4:
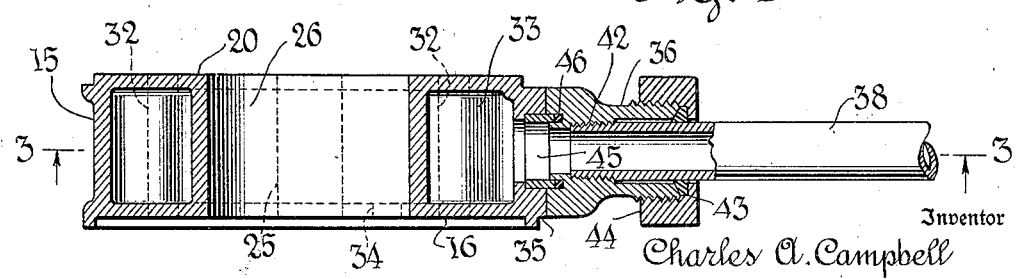
Fig. 4 is a section on the line 4—4 of Fig. 3.

These studs pass through holes 32 in the filler block, which, as best shown in Fig. 3, are isolated from the annular chamber 33 in the filler block 15. As is also shown in Fig. 3, passages 25 and 26 are also isolated from chamber 33.

A port 34 leads from chamber 33 to mounting face 16 and registers with the supplemental reservoir port in the flange 18 of the triple valve. As the form of this last port in the triple valve varies with the details of the triple valve and is not involved in the invention, no attempt to illustrate it has been made. The gasket 17 is correspondingly ported.

Formed on the filler piece 15 is a boss 35 having a ported mounting face against which is mounted a flanged union connection 36 by means of studs 37 and nuts. Connected to the flanged union connection 36 is a pipe 38 which is connected at 39 with supplemental reservoir 41.

The pipe connection 38 serves to connect the reservoir 41 with the chamber 33.

The details of the flanged union connection 36 are not material, but in the interest of completeness, they will be described. The pipe 38 is threaded into the connection at 42 and centered by beveled ring 43 and nut 44. A centering bushing 45 and ring gasket 46 secure a sealed joint.

It will be observed that the mounting faces 13 and 16 are identical in area and porting, except that the face 16 has the additional supplemental reservoir port 34.

It follows from the construction above described that the auxiliary reservoir and brake cylinder conform to present standards. In the early stages of transition from the present K triple with one reservoir to the double reservoir type of triple, the stock of new type valves available at repair points will often be small. In case of necessity a K triple may be mounted on face 16 and gasket 17. So mounted it will blank port 34 and make the necessary connections with the auxiliary reservoir 11 and brake cylinder pipe 24. This follows from the fact that mounting faces 13 and 16 are identical except that face 16 has port 34 lacking from face 13.

If a filler piece 15 is damaged, the K triple may be mounted against face 13 and gasket 14 after removing the filler piece and substituting short studs for the studs 31.

If pipe 38 or reservoir 41 become damaged on the road, they may be disconnected and the hole in flanged union 36 may be plugged. In such case, the chamber 33 acts as a miniature supplemental reservoir, permitting the triple valve 19 to perform its normal service functions. As the valve 19 is dependent on reservoir 41 for emergency air, the emergency function would be suspended.

While the design of the filler piece to preserve present standards so far as possible is desirable, certain advantages of the invention may be secured regardless of the presence of this feature. Hence, strict adherence to the described arrangement is not essential.

What is claimed is:—

1. The combination of a mounting member having a seating face provided with an auxiliary reservoir port and a brake cylinder port; a filler piece having a face which mates with said seating face, and a second seating face and ports registering with the ports on the first-named seating face and terminating on said second seating face, said filler piece having a connection for a supplemental reservoir and a port leading therefrom and terminating on said second seating face; a supplemental reservoir connected with said supplemental reservoir connection; a triple valve mounted on said second seating face and having ports which register with the ports terminating on said second seating face; and releasable means for holding the parts in assembled relation.

2. The combination of claim 1, further characterized in that the two seating faces are substantially identical, except that the second seating face includes the supplemental reservoir port.

3. The combination of claim 1, further characterized in that the supplemental reservoir port includes a substantial volume within the filler piece.

4. The combination of claim 1, further characterized in that the mating face and the second seating face on the filler piece are directly opposed to each other, and the releasable means which hold the parts in assembled relation comprise threaded members passing through the filler piece and engaging the mounting member and triple valve to clamp the filler piece between the same.

5. The combination of an auxiliary reservoir having a seating face provided with a port leading to the interior of the reservoir and a port leading to the brake cylinder; a filler piece having a face which mates with said seating face, a second seating face directly opposed to said mating face, and ports registering with the ports in the reservoir seating face and terminating on said second seating face, said filler piece having a connection for a supplemental reservoir and a port leading therefrom and terminating on said second seating face; a supplemental reservoir connected with said supplemental reservoir connection; a triple valve mounted on said second seating face and having ports which register with the ports terminating on said second seating face; and threaded connections engaging said reservoir, filler piece and triple valve, and holding the same in assembled relation.

6. The combination of claim 5, further characterized in that the two seating faces are substantially identical, except that the second seating face includes the supplemental reservoir port.

7. The combination of claim 5, further characterized in that the supplemental reservoir port includes a substantial volume within the filler piece.

8. A filler piece for interposition between a triple valve and a triple valve seat having auxiliary reservoir and brake cylinder ports, said filler piece comprising a body having a mating face adapted to mate with said triple valve seat, a secondary seat for a triple valve, and a connection for a supplemental reservoir, there being ports in said body forming extensions of the auxiliary reservoir and brake cylinder ports in the first-named seat and terminating in said secondary seat and a port leading from said supplemental reservoir connection and terminating in said secondary seat.

9. A filler piece for interposition between a triple valve and a triple valve seat having auxiliary reservoir and brake cylinder ports, said filler piece comprising a hollow body having a mating face adapted to mate with said triple valve seat, a secondary seat for a triple valve, and a connection for a supplemental reservoir communicating with the hollow interior of the body, there being a port leading from said hollow interior and terminating on said secondary seat, and ports isolated from said hollow interior, forming extensions of the auxiliary reservoir and brake cylinder ports in the first-named seat and terminating on said secondary seat.

In testimony whereof I have signed my name to this specification.

CHARLES A. CAMPBELL.